(12) United States Patent
Moriarty

(10) Patent No.: US 6,768,781 B1
(45) Date of Patent: Jul. 27, 2004

(54) METHODS AND APPARATUSES FOR REMOVING THERMAL ENERGY FROM A NUCLEAR REACTOR

(75) Inventor: Michael P. Moriarty, Simi Valley, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/405,000

(22) Filed: Mar. 31, 2003

(51) Int. Cl.$^7$ .................................. G21C 15/257
(52) U.S. Cl. ............... 376/367; 376/369; 376/374; 376/336; 376/463; 376/907; 376/908; 376/917; 376/918; 60/644.1; 60/641.14; 165/104.21; 165/104.19; 165/104.26; 165/104.27; 165/104.7; 165/104.11; 165/104.34
(58) Field of Search ............... 376/367, 369, 376/374, 386, 463, 907, 908, 917, 918; 60/644.1, 641.14; 165/104.21, 104.19, 104.26, 104.27, 104.7, 104.11, 104.34

(56) References Cited

U.S. PATENT DOCUMENTS

| | | | | |
|---|---|---|---|---|
| 3,302,042 A | * | 1/1967 | Grover et al. .............. 310/306 |
| 3,378,449 A | * | 4/1968 | Roberts et al. ............. 376/213 |
| 3,378,454 A | * | 4/1968 | Fieblemann ................ 376/424 |
| 3,414,475 A | * | 12/1968 | Fieblemann ................ 376/424 |
| 3,663,364 A | | 5/1972 | Thompson et al. ........... 176/65 |
| 3,709,781 A | * | 1/1973 | Fiebelmann et al. ........ 376/321 |
| 4,057,465 A | | 11/1977 | Thompson et al. .......... 176/38 |
| T0,101,204 I4 | * | 11/1981 | Hampel ..................... 376/221 |
| 4,367,195 A | * | 1/1983 | Aubert et al. .............. 376/290 |
| 4,560,533 A | * | 12/1985 | Huebotter et al. .......... 376/367 |
| 4,750,551 A | * | 6/1988 | Casey ....................... 376/367 |
| 4,832,113 A | * | 5/1989 | Mims et al. ................ 165/41 |
| 5,095,707 A | * | 3/1992 | Eck .......................... 60/650 |
| 5,195,575 A | * | 3/1993 | Wylie ....................... 165/132 |
| 5,219,516 A | * | 6/1993 | Horner-Richardson et al. ...... 376/321 |
| 5,319,688 A | * | 6/1994 | Hora et al. ................. 376/331 |
| 5,428,653 A | * | 6/1995 | El-Genk .................... 376/318 |
| 5,684,848 A | * | 11/1997 | Gou et al. .................. 376/367 |
| 6,718,001 B2 | * | 4/2004 | Hidaka et al. .............. 376/283 |

FOREIGN PATENT DOCUMENTS

| | | | |
|---|---|---|---|
| GB | 1220553 | * | 1/1971 |
| GB | 1220644 | * | 1/1971 |

OTHER PUBLICATIONS

Ranken, "Experimental results for space nuclear power plant design", Conference on Energy for the 21$^{st}$ century, Seattle, WA Aug. 1980, pp. 176–189.*

\* cited by examiner

Primary Examiner—Michael J. Carone
Assistant Examiner—John Richardson
(74) Attorney, Agent, or Firm—Ingrassia Fisher & Lorenz, P.C.

(57) ABSTRACT

Methods and apparatuses are provided for removing thermal energy from a nuclear reactor, which are fault tolerant. The apparatus includes at least one heat pipe configured to absorb thermal energy produced by the nuclear reactor. In addition, the apparatus includes a first compartment thermally coupled to the at least one heat pipe. The first compartment is configured to contain a first gas. Furthermore, the apparatus includes a second compartment thermally coupled to the at least one heat pipe. The second compartment is configured to contain a second gas and configured to isolate the second gas from the first gas.

19 Claims, 4 Drawing Sheets

METHODS AND APPARATUSES FOR REMOVING THERMAL ENERGY FROM A NUCLEAR REACTOR

TECHNICAL FIELD

The present invention generally relates to methods and apparatuses for removing thermal energy from a nuclear reactor, and more particularly relates to methods and apparatuses for removing thermal energy from a nuclear reactor, which are fault tolerant.

BACKGROUND

A nuclear reactor produces thermal energy (i.e., heat) by fissioning a fissile material, which is typically fabricated into fuel elements and assembled into a nuclear core. In a gas cooled nuclear reactor, the thermal energy produced by the fuel elements is transferred to a gas, which is preferably an inert gas. The heated gas is subsequently circulated through an energy conversion system that uses the heated gas to generate power, such as electrical power. The energy conversion system of the nuclear reactor can implement any number of energy conversion cycles, such as a Rankine cycle or a Brayton cycle.

Gas cooled nuclear reactors that use Rankine, Brayton or other energy conversion cycles provide an abundant source of energy for numerous applications. For example, these gas cooled nuclear reactors are preferable energy sources for spacecraft, including energy sources for propulsion and onboard applications of spacecraft. However, current gas cooled nuclear reactor designs for spacecraft and other vehicle or non-vehicle applications are subject to single point failures, which are undesirable in most, if not all situations.

For example, one single point failure, which current gas cooled nuclear reactor designs are susceptible, is a gas leak. A gas leak in the gas cooled nuclear reactor generally results in a loss of coolant. The loss of coolant typically results in an overheating of the reactor. Therefore, a gas leak can ultimately result in a reactor shutdown and removal of the energy source.

Accordingly, it is desirable to provide methods for removing thermal energy from a nuclear reactor that includes redundancy to address one or more gas leaks (i.e., methods for removing thermal energy from a nuclear reactor that are fault tolerant). In addition, it is desirable to provide apparatuses for removing thermal energy from a nuclear reactor that includes redundancy to address one or more gas leaks (i.e., apparatuses for removing thermal energy from a nuclear reactor that are fault tolerant). Furthermore, other desirable features and characteristics of the present invention will become apparent from the subsequent summary, detailed description, and the appended claims, taken in conjunction with the accompanying drawings and the foregoing technical field and background.

BRIEF SUMMARY

An apparatus is provided for removing thermal energy from a nuclear reactor that is fault tolerant. The apparatus includes at least one heat pipe configured to absorb thermal energy produced by the nuclear reactor. In addition, the apparatus includes a first compartment thermally coupled to the at least one heat pipe. The first compartment is configured to contain a first gas. Furthermore, the apparatus includes a second compartment thermally coupled to the at least one heat pipe. The second compartment is configured to contain a second gas and configured to isolate the second gas from the first gas.

A method is provided for removing thermal energy from a nuclear reactor that is fault tolerant. The method includes the steps of absorbing thermal energy produced by the nuclear reactor and transferring at least a first portion of the thermal energy to a first compartment and transferring at least a second portion of the thermal energy to a second compartment. The method further includes the steps of introducing a first gas into the first compartment and a second gas into the second compartment and isolating the second gas introduced into the second compartment from the first gas introduced into the first compartment.

BRIEF DESCRIPTION OF THE DRAWINGS

The present invention will hereinafter be described in conjunction with the following drawing figures, wherein like numerals denote like elements, and.

DETAILED DESCRIPTION

The following detailed description of the invention is merely exemplary in nature and is not intended to limit the invention or the application and uses of the invention. Furthermore, there is no intention to be bound by any expressed or implied theory presented in the preceding technical field, background, or summary, or the following detailed description or accompanying drawings.

Figure 1:
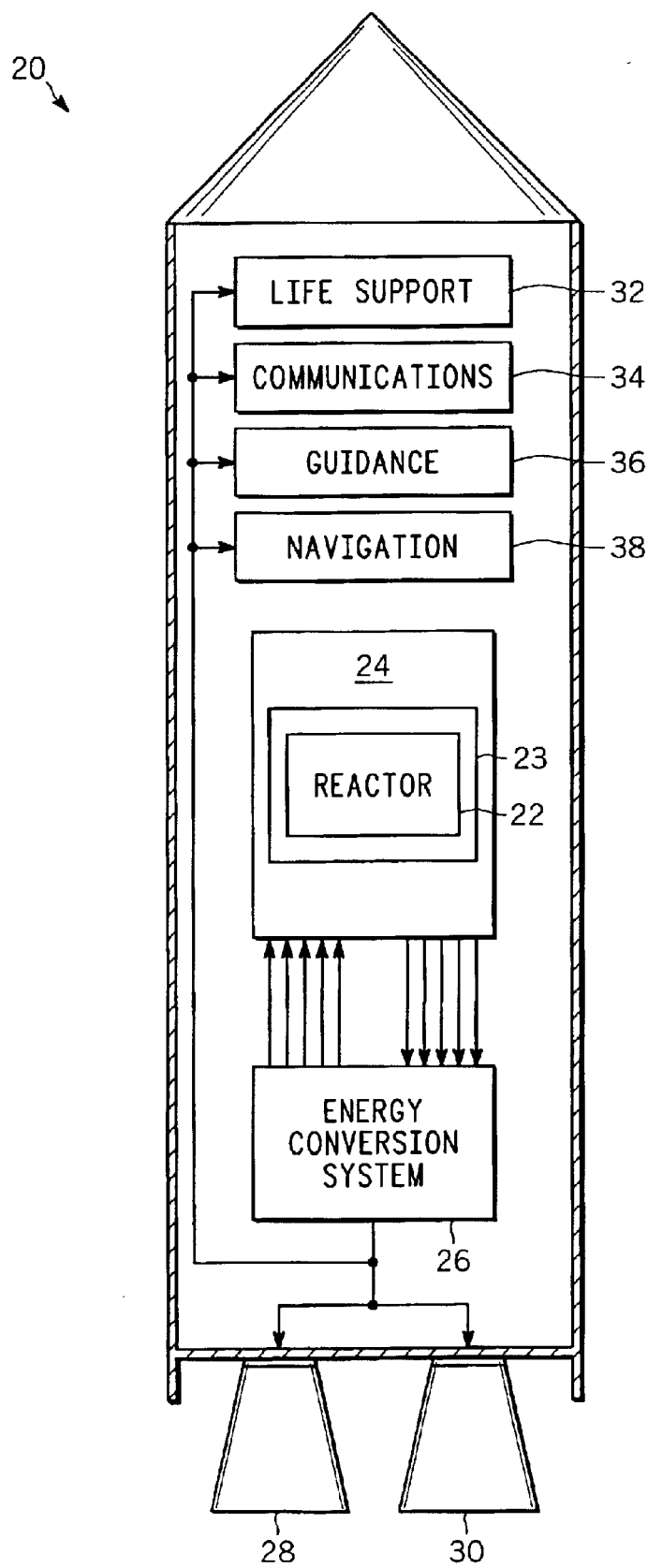
FIG. 1 is a vehicle having an apparatus for removing thermal energy from a nuclear reactor in accordance with an exemplary embodiment of the present invention.

Referring to FIG. 1, a vehicle 20 is illustrated that includes a nuclear reactor 22, a radiation shield 23 and an apparatus 24 for removing thermal energy (e.g., heat) from the reactor 22. In accordance with one exemplary embodiment, the vehicle 20 is a spacecraft. However, it should be understood that any number of land, water, air or space vehicles can utilize the apparatus 24 for removing thermal energy from the nuclear reactor 22. In addition, the apparatus 24 can be used for removing thermal energy from a nuclear reactor in a non-vehicle application. Furthermore, corresponding methods for removing thermal energy from a nuclear reactor in vehicle and non-vehicle applications are evident from the following description of the apparatus 24.

The nuclear reactor 22 is configured to generate thermal energy using any number of techniques known to those of ordinary skill in the art, such as nuclear fission (i.e., fissioning a fissile material). The apparatus 24 is thermally coupled to the nuclear reactor 22 and configured to remove at least a portion of the thermal energy generated by the nuclear reactor 22. An energy conversion system 26 is coupled to the apparatus 24 and configured to convert at least a portion of the thermal energy removed from the nuclear reactor 22 into power, such as electrical power. The energy conversion system 26 is preferably coupled to one or more systems of the vehicle 20 in order to supply at least some of the power for use by the one or more systems. For example, the energy conversion system 26 can be coupled to a propulsion system (e.g., electric thrusters (28,30)), life support system 32, communication system 34, guidance system 36, and/or navigation system 38, or the like. However, the energy conversion system 26 can be coupled to any number of individual devices or a collection of devices that can be configured to utilize the power produced from the thermal energy originally generated by the nuclear reactor 22 and removed by the apparatus 24.

Figure 2:
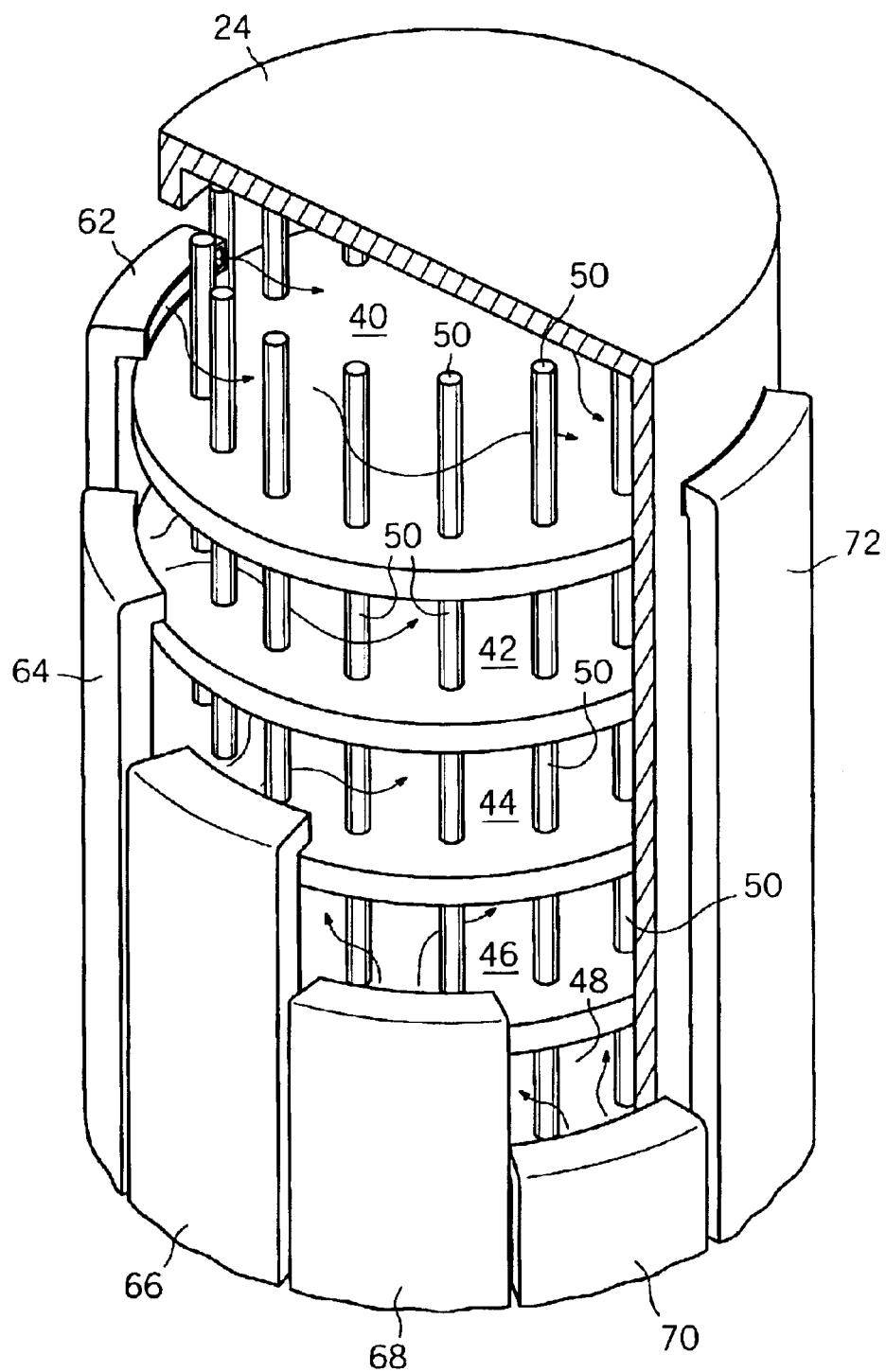
FIG. 2 is a simplified schematic of the apparatus for removing thermal energy from the nuclear reactor of FIG. 1 in accordance with an exemplary embodiment of the present invention.

Referring to FIG. 2, a perspective view of the apparatus 24 is illustrated in accordance with an exemplary embodiment of the present invention. Generally, the apparatus 24 has multiple compartments (40,42,44,46,48) and at least one heat pipe 50 that is thermally coupled to the one or more of the compartments (40,42,44,46,48). Preferably, the apparatus 24 includes multiple heat pipes 50 that are thermally coupled to one or more of the compartments (40,42,44,46, 48) and the one or more heat pipes 50 are configured to absorb at least a portion of the thermal energy produced by the nuclear reactor and transfer at least a portion of this absorbed thermal energy into one or more of the compartments (40,42,44,46,48).

Figure 3:
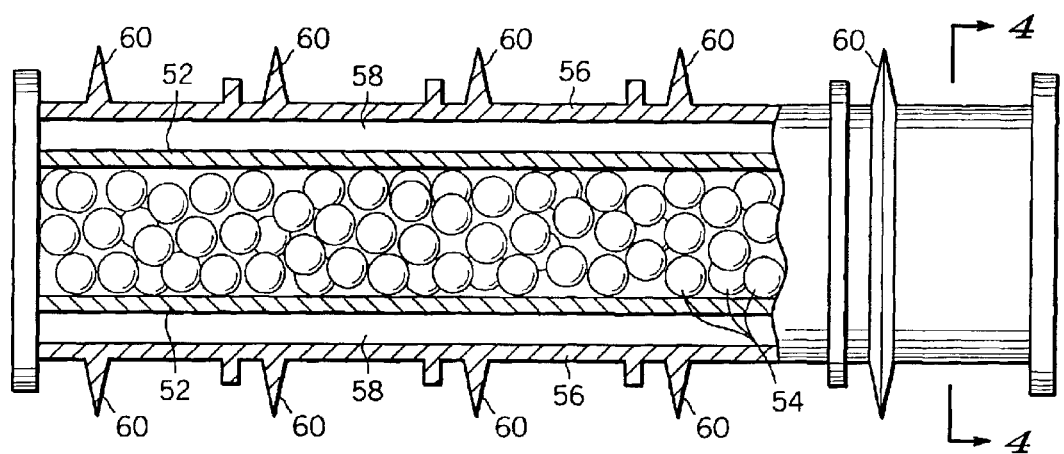
FIG. 3 is a heat pipe of the apparatus for removing thermal energy from the nuclear reactor of FIG. 2 in accordance with an exemplary embodiment of the present invention.
Figure 4:
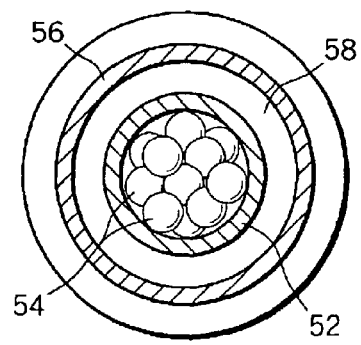
FIG. 4 is a cross-sectional view of the heat pipe of FIG. 3 taken along lines 4—4.

Referring to FIG. 3 and FIG. 4, a heat pipe 50 is illustrated in accordance with an exemplary embodiment of the present invention. Preferably, the heat pipe 50 is an annular heat pipe that is preferably formed of thermally conductive material. The heat pipe 50 is configured to enclose one or more nuclear fuel pins 54 of the nuclear reactor, which are composed of any number of nuclear materials such as uranium, plutonium, uranium nitride, uranium oxide or the like. The annular of the heat pipe 50 shape can be any number of ellipses, including a circle as shown in FIG. 4, or the pipe can have a non-annular configuration, such as a pipe with a triangular, rectangular, pentagonal, or hexagonal configuration, or the like.

Preferably, the heat pipe 50 includes an inner pipe 52 enclosing the nuclear fuel 54, an outer pipe 56 enclosing the inner pipe 52, and a space 58 interposed between the inner pipe 52 and the outer pipe 56. Preferably, the space 58 is a vapor space that contains a fluid and the outer pipe 56 has one or more protrusions, ribs or fins 60. The fluid within the space 58 can be any number of gases or liquids and the one or more protrusions, ribs or fins 60 preferably extend from the outer pipe 56 and one or more protrusions, ribs or fins 60 preferably exists for each of the compartments in thermal contact with the heat pipe(s). The fluid in the space 58 and/or the one or more protrusions, ribs or fins 60 enhances the transfer of thermal energy from the nuclear fuel to the separate environment or environments surrounding the heat pipe, which in the present invention is the one or more of the compartments (40,42,44,46,48) as shown in FIG. 2.

Referring to FIG. 2, the apparatus 24 is shown with five compartments (e.g., a first compartment 40, a second compartment 42, a third compartment 44, a fourth compartment 46, and a fifth compartment 48) that provide five separate environments surrounding the heat pipes 50. However, the apparatus 24 can have fewer than five compartments and greater than five compartments. At least the first compartment 40 and the second compartment 42 are thermally coupled to at least one of the heat pipes 50 and more preferably thermally coupled to substantially all or all of the heat pipes 50. Even more preferably, each of the first compartment 40, second compartment 42, third compartment 44, fourth compartment 46 and fifth compartment 48 are thermally coupled to at least one of the heat pipes 50 and most preferably each of the each of the first compartment 40, second compartment 42, third compartment 44, fourth compartment 46 and fifth compartment 48 are thermally coupled to substantially all or all of the heat pipes 50.

At least the first compartment 40 and second compartment 42 are configured to contain a first gas and a second gas, respectively. Furthermore, if the apparatus 24 has additional compartments, such as the third compartment 44, fourth compartment 46, fifth compartment 48, or other compartments, each of these additional compartments are preferably configured to contain a gas. For example, the third compartment 44, fourth compartment 46 and fifth compartment 48 can be configured to contain a third gas, fourth gas, and a fifth gas, respectively.

Each of these gases in the compartments (40,42,44,46,48) can be any number of gases, and each of the gases is preferably an inert gas. For example, the gas of one or more of the compartments can be helium or argon. Each of the gases in each of the compartments can be the same or similar type of gas or each of the gases in each of the compartment can be a different type of gas.

In addition to containment of a gas, at least two or the compartments, preferably more than two of the compartments, and more preferably each of the compartments (40,42,44,46,48) are configured to isolate the gas contained in the respective compartment. As used herein, a structure is configured to isolate a gas from another gas in another structure if the gas cannot enter the structure with the other gas. Therefore, a compartment is configured to isolate a gas from another gas in another compartment if the gas cannot enter the compartment with the other gas For example, the second compartment 42 is configured to at least isolate the second gas from the first gas contained in the first compartment 40 and also preferably configured to isolate the second gas from the gases contained in the third compartment 44, fourth compartment 46, and fifth compartment 48. In addition, each of the gases contained in each of the compartments are isolated from the other gases contained in the other compartments. This isolation of the gases in each of the compartments provides redundancy in the apparatus 24 for removing thermal energy from the nuclear reactor, as a gas leak in one or more of the compartment does not result in a complete gas loss of the apparatus 24. Furthermore, at least a portion of the thermal energy previously removed by the gas in a leaking compartment is distributed to non-leaking compartments in accordance with the present invention through one or more of the heat pipes 50 and adjoining walls of the compartments (40,42,44,46,48).

The gas in each of the compartments (40,42,44,46,48) is preferably received through an inlet duct (62,64,66,68,70) associated with one of the compartments (40,42,44,46,48). With particular reference to the first compartment 40 as an illustrative example, the gas flows from the inlet duct 62 into the first compartment 40. As the gas flows through the first compartment 40, contact is made with the heat pipes 50 extending into the first compartment 40 and the thermal energy absorbed by the heat pipes 50 is transferred to the gas, thereby heating the gas. The heated gas exists through an outlet duct 72 associated with the first compartment 40, where it is preferably converted to power by an energy conversion system.

Figure 5:
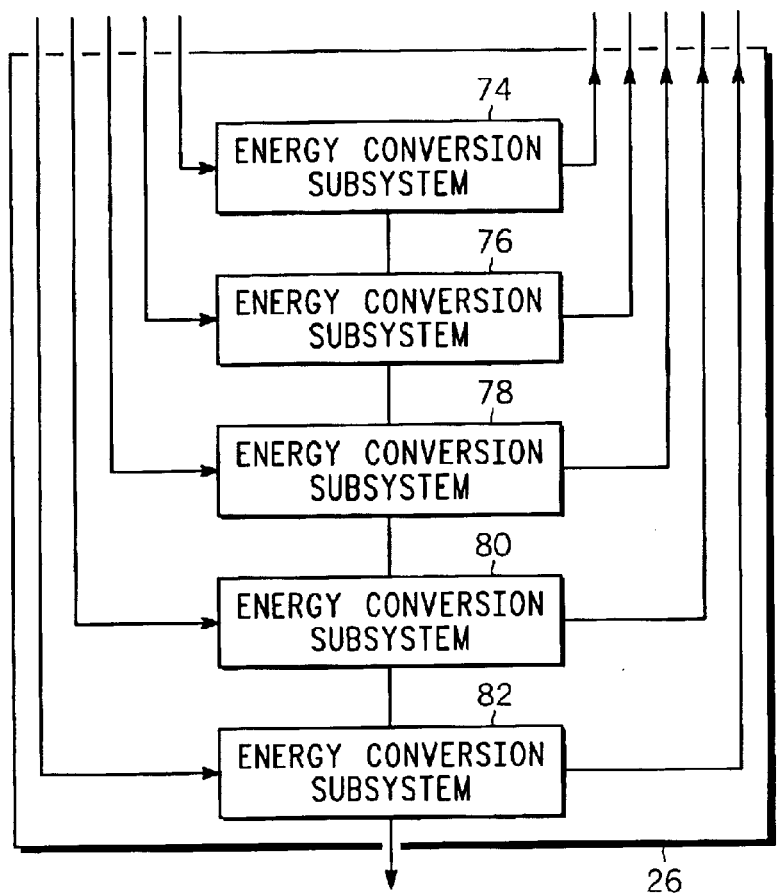
FIG. 5 is the energy conversion system of FIG. 1 in accordance with an exemplary embodiment of the present invention.

Referring to FIG. 5, the energy conversion system 26 is illustrated in additional detail in accordance with an exemplary embodiment of the present invention. The energy conversion system 26 preferably includes multiple energy conversion subsystems (74,76,78,80,82), with the energy conversion subsystems configured to receive the heated gas and use the heated gas to generate power, such as electrical power. Preferably, a single energy conversion sub-system is associated with each of the compartments in order to maintain the isolation of the gases. However, a single energy conversion sub-system can be configured to receive the heated gases from more than one compartment, thereby maintaining isolation of gases in the compartments associated with the single energy conversion sub-system.

Figure 6:
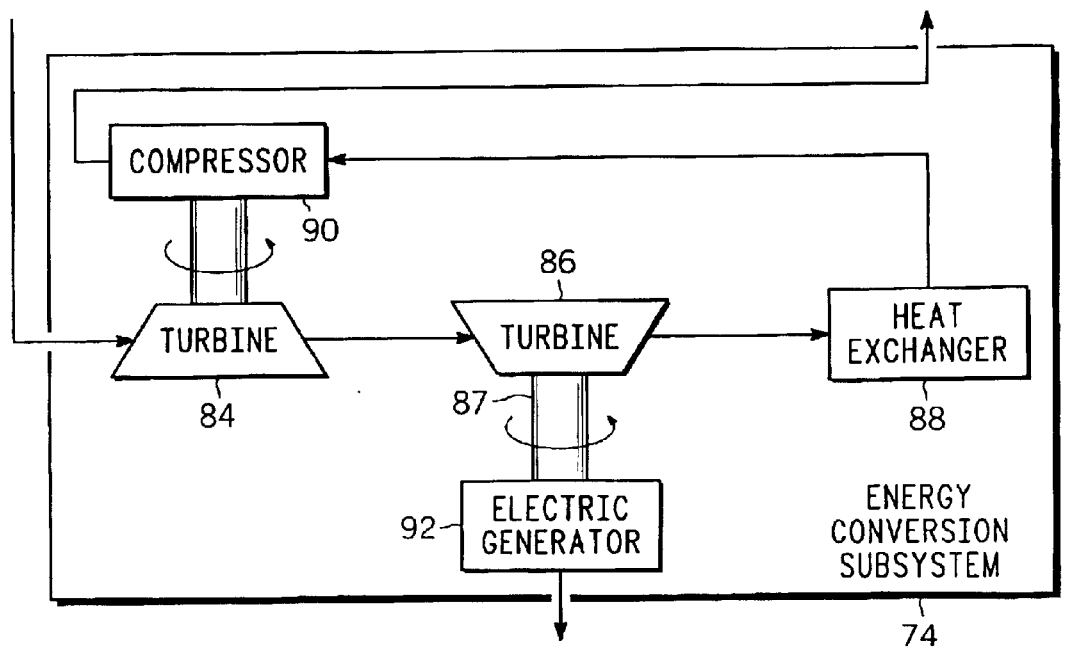
FIG. 6 is one of the energy conversion subsystems of FIG. 5 in greater detail in accordance with the present invention.

Referring to FIG. 6, one of the energy conversion subsystems 74 of FIG. 5 is illustrated in greater detail. Each of the subsystems can have the configuration shown in FIG. 6, or one or more of the subsystems can have a different energy conversion configuration. In this illustrative example, the energy conversion subsystem 74 implements a Brayton energy conversion cycle. However, other energy conversion cycles can be implemented in accordance with the present invention, including but not limited to a Rankine energy conversion cycle.

Generally, the Brayton energy conversion cycle is conducted with a compressor turbine 84, work turbine 86, heat exchanger 88 and compressor 90. Initially, the heated gas exiting the outlet conduit passes through the compressor turbine 84 and subsequently passes through the work turbine 86. The compressor turbine 84 is mechanically coupled to the compressor 90 and generally provides the powering force to operate the compressor 90. The work turbine 86 rotates a turbine shaft, which is connected to any number of mechanisms that generate power, such as an electrical power generator 92, as known to those of ordinary skill in the art. After the heated gas passes through the compressor turbine 84 and work turbine 86, it is preferably thermally conditioned by the heat exchanger 88. For example, the temperature of the gas exiting the turbines (84,86) is reduced by the heat exchanger 88. The gas exiting the heat exchanger 88 is compressed and passed to the inlet conduit of the apparatus for thermal conditioning (i.e., heating) of the gas by the reactor, and the cycle repeats.

This well known cycle and the mechanical elements performing the Brayton cycle can be implemented with any number of mechanisms and variations to produce an abundant source of energy for numerous applications, including vehicle and non-vehicle applications, with the thermal energy removed from the nuclear reactor with the apparatus of the present invention. (See U.S. Pat. No. 3,663,364 as issued to Thompson et al on May 16, 1972 and U.S. Pat. No. 4,057,465 as issued to Thompson et al on Nov. 8, 1997 for additional descriptions of the flow loop, which are both hereby incorporated in their entirety by reference.) Alternatively, other energy conversion cycles can be used to generate power with the thermal energy removed from the nuclear reactor of the present invention. Nevertheless, the apparatuses and corresponding methods of the present invention increase energy source reliability as a gas leak will result in an isolated loss of gas that does not significantly reduce the gas that is available for removal of thermal energy from the reactor. Accordingly, a gas leak will not typically result in an overheating of the nuclear reactor and the ultimate shutdown of the reactor as the remaining non-leaking compartments provide the gas to adequately remove the thermal energy from the nuclear reactor.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An apparatus for removing thermal energy from a nuclear reactor, comprising:
   a heat pipe configured to absorb the thermal energy produced by the nuclear reactor;
   a first compartment thermally coupled to said heat pipe;
   first gas inlet and gas outlet ducts coupled to said first compartment;
   a second compartment thermally coupled to said heat pipe; and
   second gas inlet and gas outlet ducts coupled to said second compartment,
   wherein said first compartment, said first gas inlet, and said first gas outlet are pneumatically isolated from said second compartment, said second gas inlet, and said second gas outlet.

2. The apparatus according to claim 1, further comprising:
   a third compartment thermally coupled to said heat pipe; and
   third gas inlet and gas outlet ducts coupled to said third compartment.

3. The apparatus according to claim 2, wherein said third compartment, said third gas inlet duct, and said third gas outlet duct are pneumatically isolated from said first compartment, said first gas inlet, and said first gas outlet.

4. The apparatus according to claim 2, wherein said third compartment, said third gas inlet duct, and said third gas outlet duct are pneumatically isolated from said first and second gas compartments, said first and second gas inlet ducts, and said first and second gas outlet ducts.

5. The apparatus according to claim 2, further comprising.
   a fourth compartment thermally coupled to said heat pipe; and
   fourth gas inlet and gas outlet ducts coupled to said fourth compartment.

6. The apparatus according to claim 5, wherein said fourth compartment, said fourth gas inlet duct, and said fourth gas outlet duct are pneumatically isolated from said first compartment, said first gas inlet, and said first gas outlet.

7. The apparatus according to claim 5, wherein said fourth compartment, said fourth gas inlet duct, and said fourth gas outlet duct are pneumatically isolated from said first, second, and third gas compartments, said first, second, and third gas inlet ducts, and said first, second, and third gas outlet ducts.

8. The apparatus according to claim 5, further comprising:
   a fifth compartment thermally coupled to said heat pipe; and
   fifth gas inlet and gas outlet ducts coupled to said fifth compartment.

9. The apparatus for removing thermal energy from the nuclear reactor of claim 8, wherein said first compartment, said fifth gas inlet duct, and said fifth gas outlet duct are pneumatically isolated from said first compartment, said first gas inlet, and said first gas outlet.

10. The apparatus for removing thermal energy from the nuclear reactor of claim 5, wherein said fifth compartment, said fifth gas inlet duct, and said fifth gas outlet duct are pneumatically isolated from said first, second, third, and fourth gas compartments, said first, second, third, and fourth gas inlet ducts, and said first, second, third, and fourth gas outlet ducts.

11. The apparatus for removing thermal energy from the nuclear reactor of claim 1, further comprising a plurality of heat pipes in addition to said heat pipe that are the coupled to said first compartment and said second compartment.

12. The apparatus for removing thermal energy from the nuclear reactor of claim 8, further comprising a plurality of heat pipes in addition to said heat pipe that are thermal coupled to said first compartment, said second compartment, said third compartment, said fourth compartment and said fifth compartment.

13. The apparatus for removing thermal energy from the nuclear reactor of claim 1, said heat pipe comprising:
an inner pipe enclosing nuclear fuel of the nuclear reactor;
an outer pipe enclosing the inner pipe; and
a space interposed between said inner pipe and said outer pipe.

14. The apparatus for removing thermal energy from the nuclear reactor of claim 13, wherein said space is a vapor space that is configured to contain a fluid.

15. The apparatus for removing thermal energy from the nuclear reactor of claim 13, wherein said outer pipe has first protusion extending into said first compartment.

16. The apparatus for removing thermal energy from the nuclear reactor of claim 15, further comprising a second protrusion extending into said second compartment.

17. A vehicle, comprising:
a nuclear reactor;
an apparatus for removing thermal energy from said nuclear reactor, said apparatus comprising:
a heat pipe configured to absorb thermal energy produced by the nuclear reactor;
a first compartment thermally coupled to said heat pipe;
first gas inlet and gas outlet ducts coupled to said first compartment;
a second compartment thermally coupled to said heat pipe; and
second gas inlet and gas outlet ducts coupled to said second compartment, wherein said first compartment, said first gas inlet, and said first gas outlet are pneumatically isolated from said second compartment, said second gas inlet, and said second gas outlet; and
an energy conversion system configured to convert at least a portion of said thermal energy removed from said nuclear reactor by said apparus into power for the vehicle.

18. The vehicle of claim 17, wherein said vehicle is a spacecraft.

19. The vehicle of claim 17, wherein said energy conversion system is configured to implement a Brayton energy conversion cycle for conversion of said portion of said thermal energy removed from said nuclear reactor by said apparatus into power for the vehicle.

* * * * *

UNITED STATES PATENT AND TRADEMARK OFFICE
CERTIFICATE OF CORRECTION

PATENT NO. : 6,768,781 B1
DATED : July 27, 2004
INVENTOR(S) : Michael P. Moriarty It is certified that error appears in the above-identified patent and that said Letters Patent is hereby corrected as shown below:

<u>Column 7,</u>
Line 10, delete "the" and add -- thermal --.

Signed and Sealed this

Thirtieth Day of November, 2004

JON W. DUDAS
*Director of the United States Patent and Trademark Office*